United States Patent
Sakamoto

(12) 
(10) Patent No.: US 6,284,558 B1
(45) Date of Patent: Sep. 4, 2001

(54) ACTIVE MATRIX LIQUID-CRYSTAL DISPLAY DEVICE AND METHOD FOR MAKING THE SAME

(75) Inventor: Michiaki Sakamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/199,790

(22) Filed: Nov. 25, 1998

(30) Foreign Application Priority Data

Nov. 25, 1997 (JP) .................................................. 9-323423

(51) Int. Cl.⁷ .................................................. H01L 21/00
(52) U.S. Cl. .................................................. 438/30; 438/29
(58) Field of Search .................... 438/29, 30; 259/59, 259/72; 349/122, 138

(56) References Cited

U.S. PATENT DOCUMENTS

| | | | |
|---|---|---|---|
| 5,926,235 | * 7/1999 | Han et al. | 257/59 |
| 5,926,242 | * 7/1999 | Kataoka et al. | 349/122 |
| 5,963,279 | * 10/1999 | Taguchi | 349/122 |

FOREIGN PATENT DOCUMENTS

| | | |
|---|---|---|
| 0 603 866 A1 | 6/1994 | (EP) . |
| 0 762 184 A1 | 3/1997 | (EP) . |
| 2 311 653 | 10/1997 | (GB) . |
| 64-73316 | 3/1989 | (JP) . |
| 9-244009 | 9/1997 | (JP) . |
| 9-325330 | 12/1997 | (JP) . |
| 10-96963 | 4/1998 | (JP) . |
| 10-161158 | 6/1998 | (JP) . |
| 91-10623 | 6/1991 | (KR) . |

* cited by examiner

Primary Examiner—Kevin M. Picardat
(74) Attorney, Agent, or Firm—Sughrue, Mion, Zinn, Macpeak & Seas, PLLC

(57) ABSTRACT

Disclosed is a method for making an active matrix liquid-crystal display device, this method having the steps of: forming interlayer insulating film, at least part of which composed of organic film, on a TFT(thin-film transistor) substrate with a structure where a pixel electrode and wiring are overlapped; patterning the organic film; and patterning a base layer using the patterned organic film as a mask. Also disclosed is an active matrix liquid-crystal display device, which has: a TFT(thin-film transistor) substrate with a structure where a pixel electrode and wiring are overlapped; and interlayer insulating film, at least part of which composed of organic film; wherein the organic film has a transmissivity of greater than 90% to g-line light and the heat resistance of organic film is higher than 250° C.

19 Claims, 8 Drawing Sheets

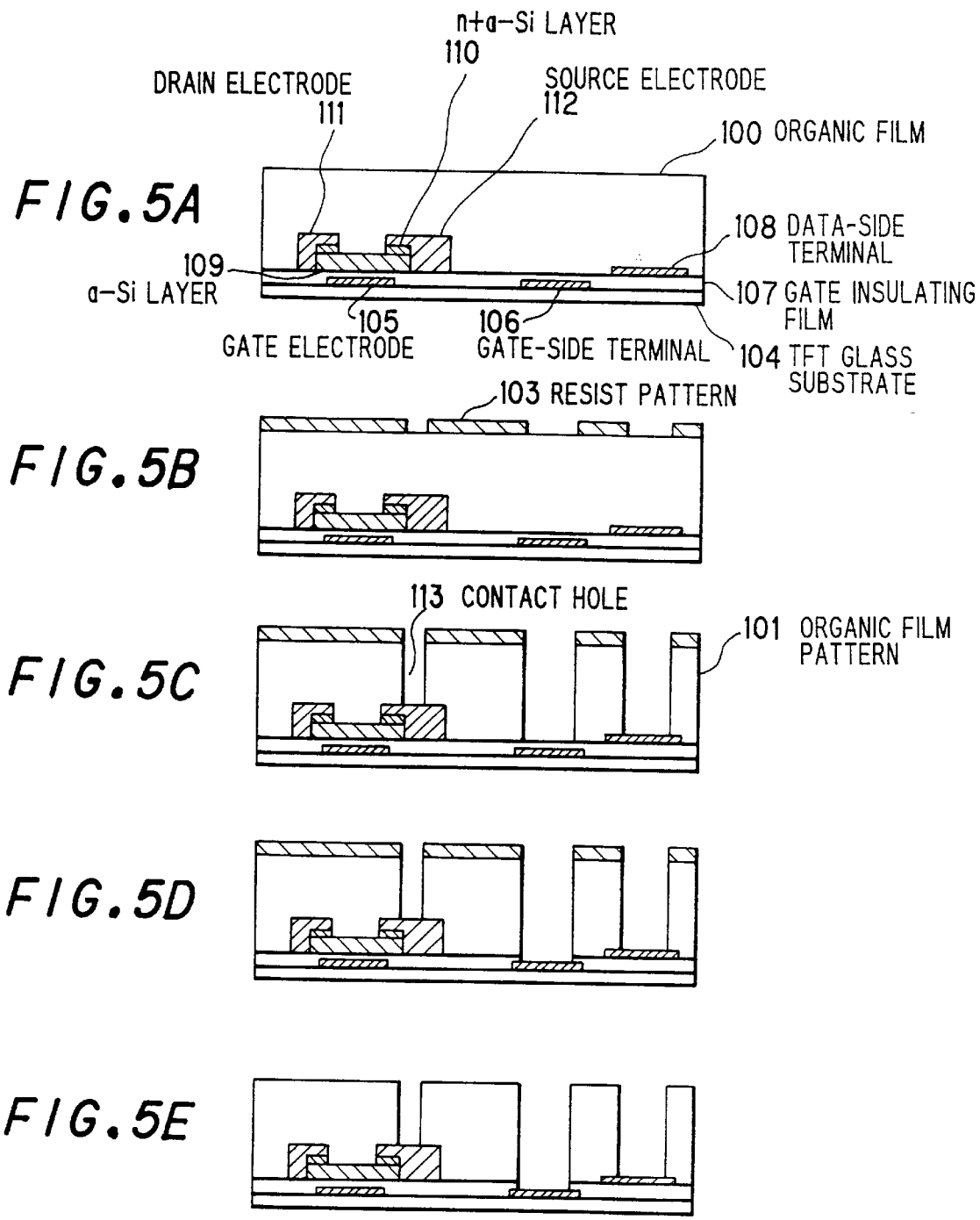

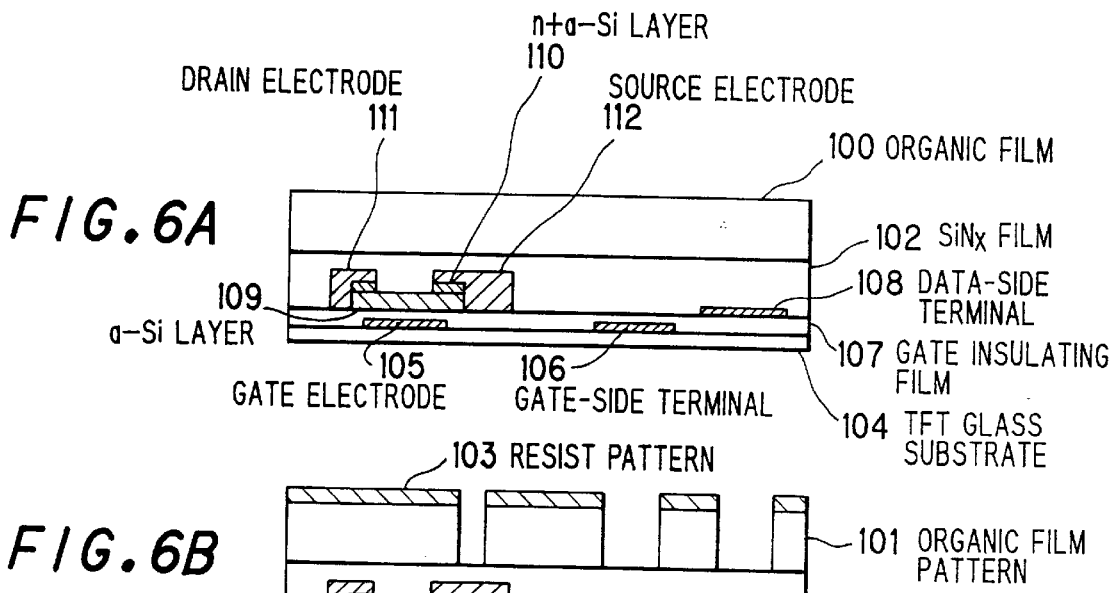
FIG.6A
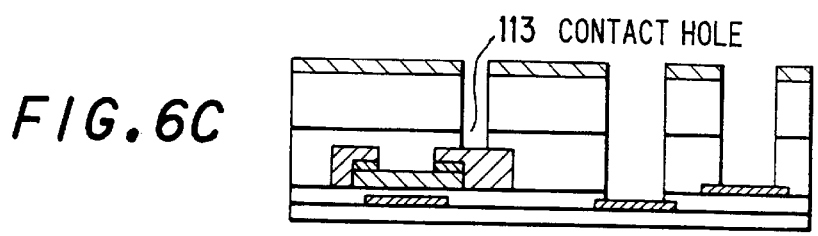
FIG.6B
FIG.6C
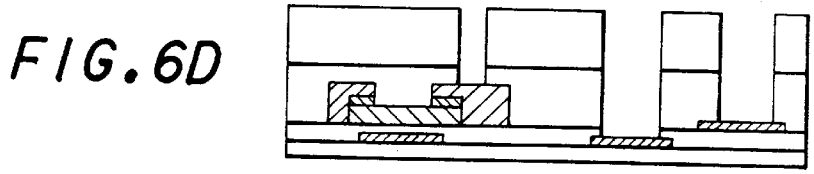
FIG.6D

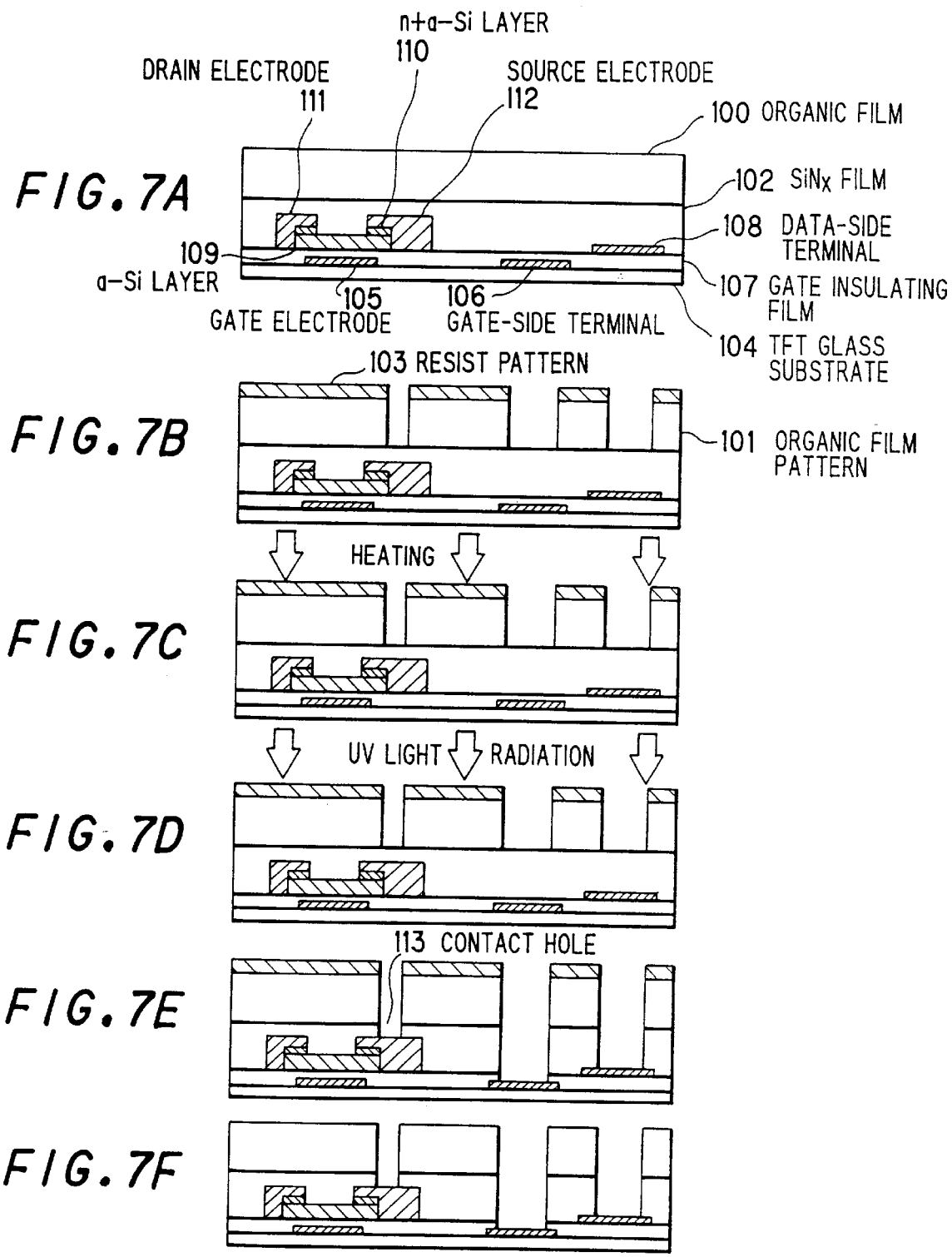

ACTIVE MATRIX LIQUID-CRYSTAL DISPLAY DEVICE AND METHOD FOR MAKING THE SAME

FIELD OF THE INVENTION

This invention relates to an active matrix liquid-crystal display device with thin-film transistor (TFT) substrate and a method for making the same.

BACKGROUND OF THE INVENTION

A conventional active matrix liquid-crystal (hereinafter also referred to as 'LC') display device with thin-film transistor(TFT) substrate will be explained below, referring to FIG. 1. This device, as shown in FIG. 1B, has the structure that a twist-nematic liquid-crystal layer 620 is sandwiched between a TFT substrate 630 and a color filter (CF) substrate 610. The TFT substrate 630 has the structure that, on a TFT glass substrate 104, a gate electrode 105, gate insulating film 107, a-Si layer 109, n+a-Si layer 110, a source electrode 112 and drain electrode 111, a pixel electrode 631, and passivation film 632 are formed in this order. As the passivation film 632, SiN film of about 300 nm thick made by plasma CVD is typically used. On the other hand, the CF substrate 610 has the structure that a black matrix 612, color layer 613 and an opposing electrode 614 are formed, in this order, on a CF glass substrate 611.

In such an active matrix liquid-crystal display device as composed above, it is necessary to the black matrix 612 so as to shield light through a light-leaked region B. Therefore, by reason that it is necessary to estimate an overlap margin of this light-shielding part, a light-transmitted region A of the LC display panel is reduced. Thus, there is the problem that the transmissivity of the entire device is reduced.

So, means for enlarging the light-transmitted region, i.e., means for enhancing the aperture ratio is proposed, e.g., Japanese patent application laid-open No.9-152625 (1997). This device has, as show in FIG. 2A, the structure that the pixel electrode 631, data line 602 and gate line 601 are overlapped. In such an active matrix liquid-crystal display as thus composed, it is necessary to form interlayer insulating film 701 by using a material with low permittivity and possible to thicken so as to reduce the overlap capacity of the pixel electrode 631, data line 602 and gate line 601. For example, used is interlayer insulating film where 2 to 4 μm thick positive type photosensitive acrylic resin with specific permittivity ϵ=3.0 is laminated on inorganic film of SiN conventionally used.

The method of making the interlayer insulating film 701 will be explained below, referring to FIGS. 3A to 3D. Like conventional methods, SiN layer 102 of about 300 nm thick is laminated by plasma CVD, forming a contact hole 113 by patterning (FIG. 3A). Then, after coating it with photosensitive acrylic resin, patterning is conducted by pre-baking, exposure and alkali-development (FIGS. 3B and 3C). Then, UV light including i line is radiated all over the surface to decolorize into transparent film. Then, the resin is hardened by thermal cross-linking reaction. Then, transparent film such as ITO is formed by sputtering, patterned into the pixel electrode 631 (FIG. 3D). Finally, it is annealed at 250° C. for about 30 min.

In the active matrix liquid-crystal display device with TFT substrate thus obtained, there is no light-leaked region, and therefore the black matrix is not necessary. Therefore, the numerical aperture can be enhanced.

However, in the conventional method, the layer formation and patterning are conducted for each of the SiN layer and organic film. Also, after patterning of organic film by wet-etching, it is desired that dry-etching is conducted to remove the remaining resin that may cause a failure in contact. Due to these, the number of processes is increased. Thus, there are problems in working property and productivity.

To prevent the increase in the number of processes to enhance the productivity, it might be suitable that the processes are conducted in the lump as much as possible. For example, after forming the SiN layer and organic film and then wet-etching the organic film, dry-etching of base layer can be conducted using the obtained organic film pattern as a mask. However, the positive type photosensitive acrylic resin lacks in resistance to dry-etching, and therefore its surface is significantly worn out by dry-etching. Therefore, such a method cannot be applied.

Also, there is the problem that the near i-line optical transmissivity of positive type photosensitive acrylic resin is low. Also, the thermal resistance of photosensitive group is not sufficient and the transmissivity is therefore like to further reduce due to the thermal treatment such as annealing in post-process. Therefore, the performance of TFT(thin-film transistor) substrate is deteriorated.

SUMMARY OF THE INVENTION

Accordingly, it is an object of the invention to provide a method for efficiently producing interlayer insulating film with high transmissivity and high thermal resistance in TFT substrate with a structure where pixel electrode and wiring are overlapped.

It is a further object of the invention to provide an active matrix liquid-crystal display device including such a TFT substrate.

According to the invention, a method for making an active matrix liquid-crystal display device, comprises the steps of:

forming interlayer insulating film, at least part of which composed of organic film, on a TFT(thin-film transistor) substrate with a structure where a pixel electrode and wiring are overlapped;

patterning the organic film; and patterning a base layer using the patterned organic film as a mask.

According to another aspect of the invention, an active matrix liquid-crystal display device, comprises:

a TFT(thin-film transistor) substrate with a structure where a pixel electrode and wiring are overlapped; and interlayer insulating film, at least part of which composed of organic film;

wherein the organic film has a transmissivity of greater than 90% to g-line light and the heat resistance of organic film is higher than 250° C.

BRIEF DESCRIPTION OF THE DRAWINGS

The invention will be explained in more detail in conjunction with the appended drawings, wherein:

FIGS. 5A to 5E are cross sectional views showing a method of making an active matrix liquid-crystal display device in a second preferred embodiment according to the invention, FIGS. 6A to 6D are cross sectional views showing a method of making an active matrix liquid-crystal display device in a third preferred embodiment according to the invention, FIGS. 7A to 7F are cross sectional views showing a method of making an active matrix liquid-crystal display device in a fourth preferred embodiment according to the invention.

DESCRIPTION OF THE PREFERRED EMBODIMENTS

The first preferred embodiment of the invention will be explained below. In this embodiment, benzocyclobutene polymer is used as a material for interlayer insulating film. The process of making thereof will be detailed in FIGS. 4A to 4E.

Figure 1A:
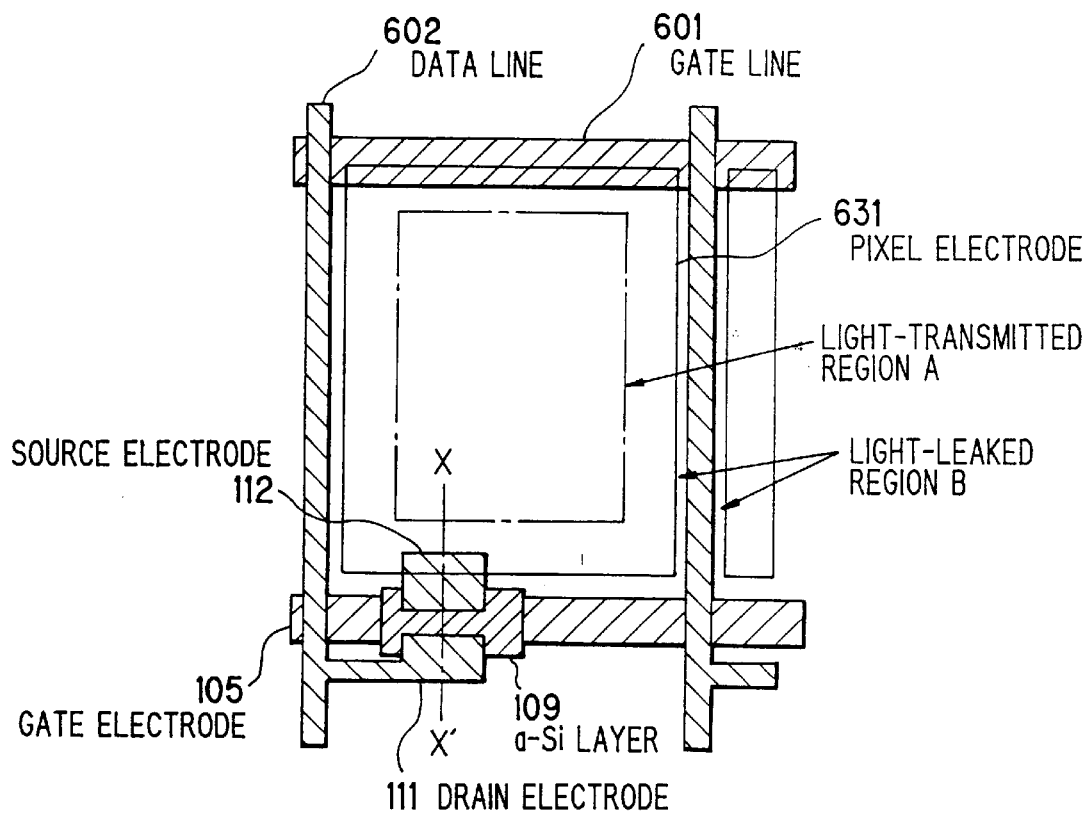
FIGS. 1A and 1B are a plan view and a cross sectional view, respectively, showing one pixel of a first conventional liquid-crystal display device.
Figure 1B:
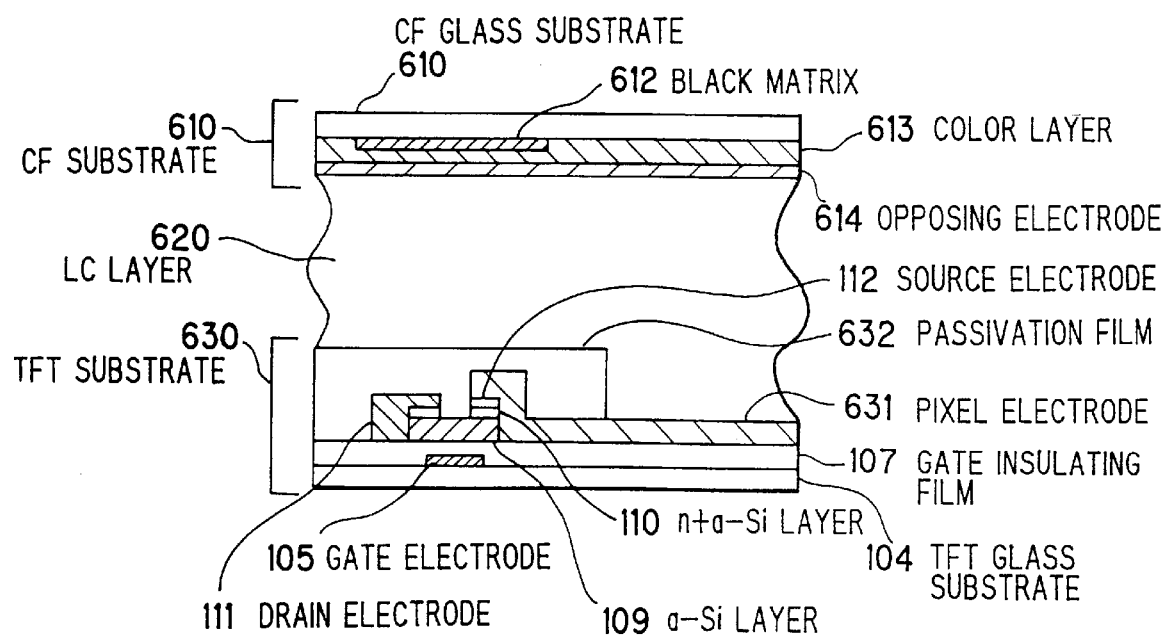
Figure 2A:
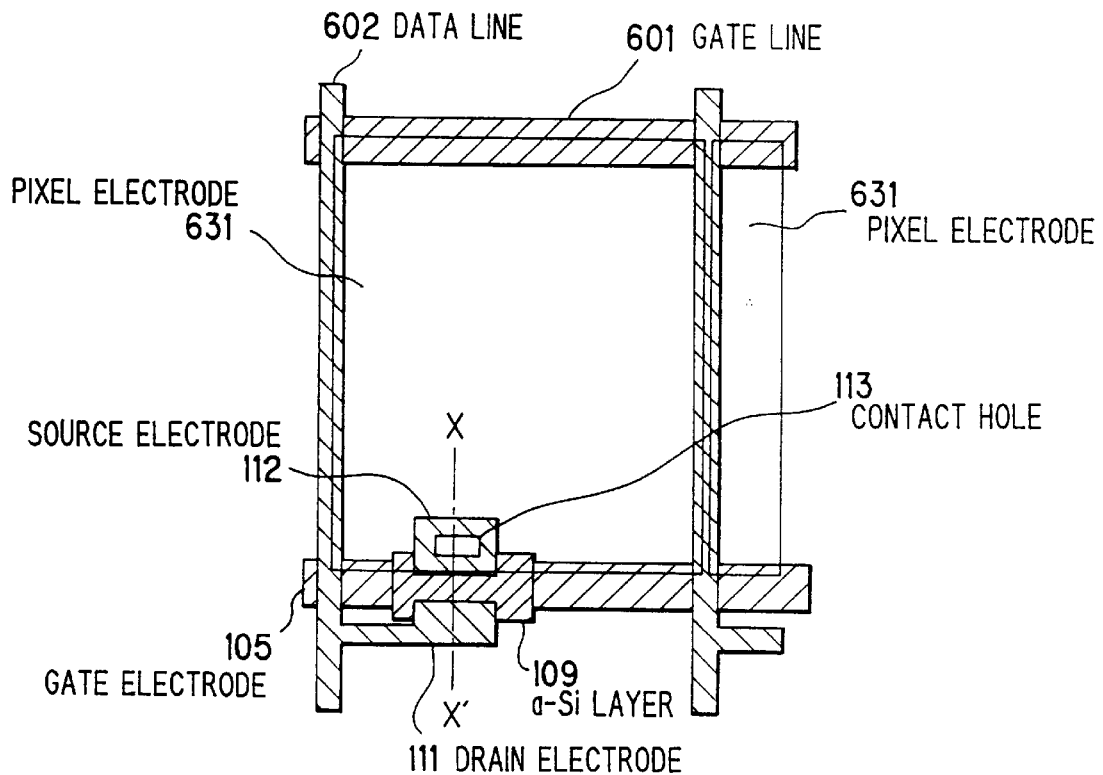
FIGS. 2A and 2B are a plan view and a cross sectional view, respectively, showing one pixel of a second conventional liquid-crystal display device.
Figure 2B:
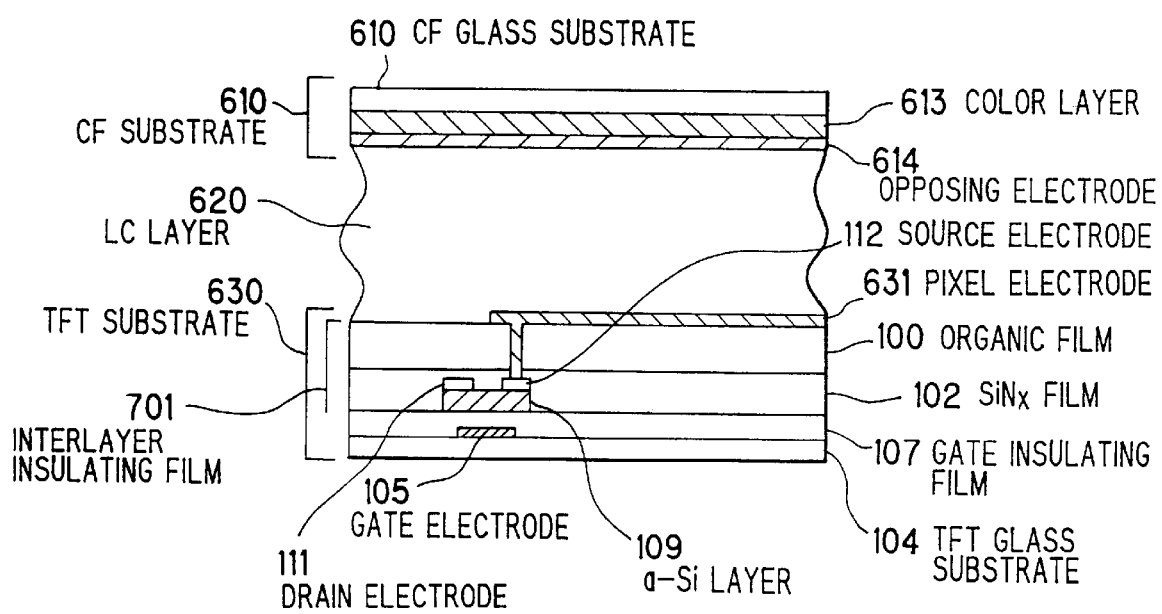
Figure 3A:
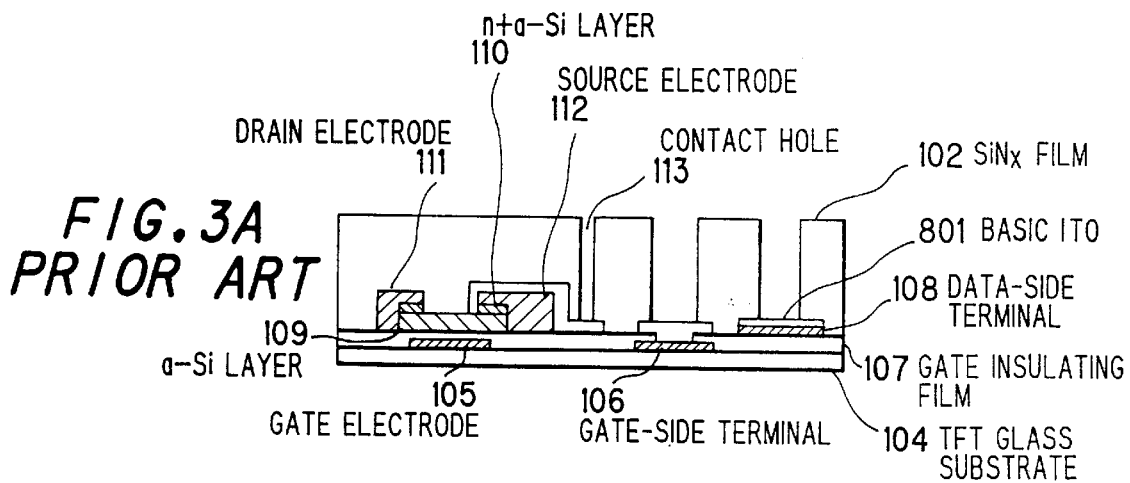
FIGS. 3A to 3D are cross sectional views showing the method of making the second conventional liquid-crystal display device.
Figure 3B:
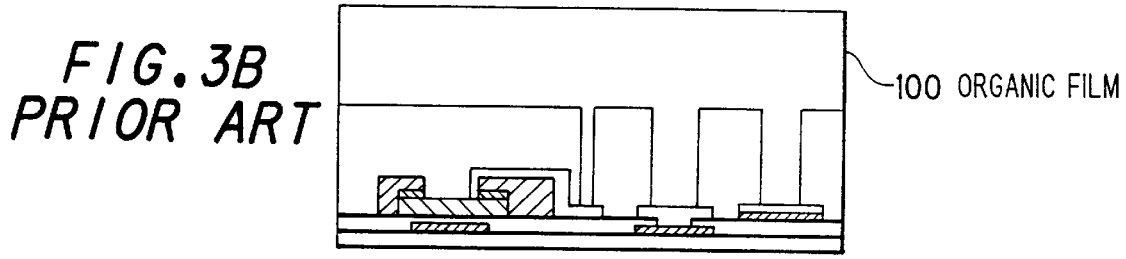
Figure 3C:
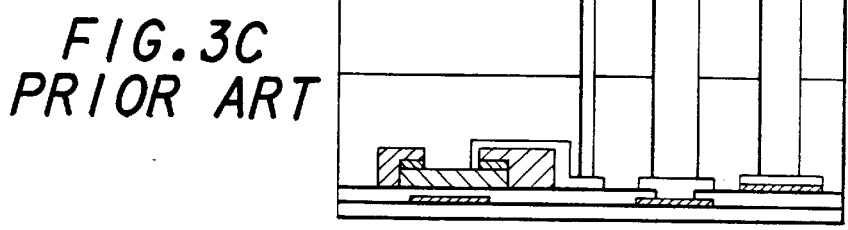
Figure 3D:
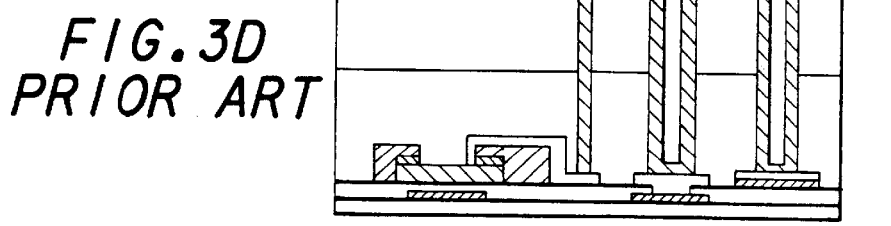
Figure 4A:
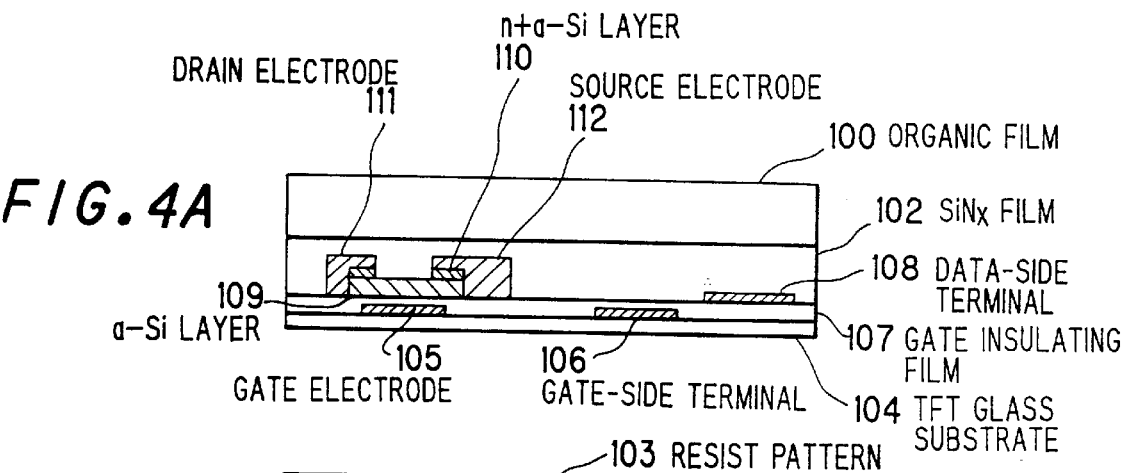
FIGS. 4A to 4E are cross sectional views showing a method of making an active matrix liquid-crystal display device in a first preferred embodiment according to the invention.
Figure 4B:
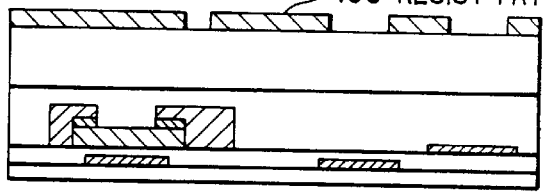
Figure 4C:
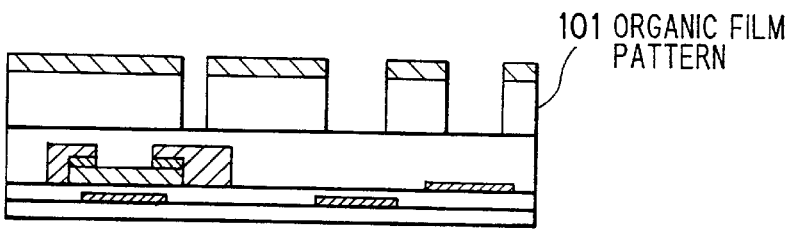
Figure 4D:
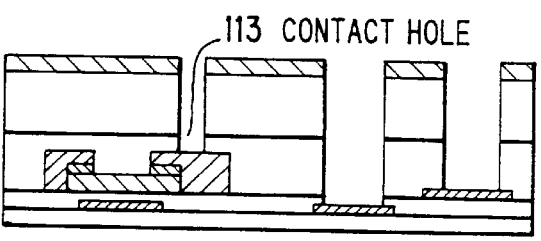
Figure 4E:
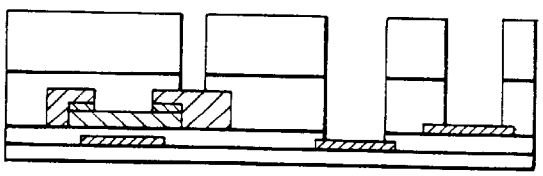

Benzocyclobutene polymer is applied on SiNx film 102, which is formed like the conventional method, by spin coating, pre-baked at 170° C. (FIG. 4A). Due to this pre-baking, the etching rate of benzocyclobutene polymer is varied, and it becomes insoluble to a resist solvent described later. Then, by applying naphthoquinonediazo-novolac system positive type resist using propyleneglycolmonoethyl-etheracetate solvent, and then conducting the baking, exposure and development, resist pattern 103 is formed (FIG. 4B). As resist developer, about 0.1 to 1 mol % tetramethy-lammoniumhydroxide (TMAH) solution is used. Then, using the resist pattern 103 as a mask, organic film 100 of benzocyclobutene polymer is wet-etched, thereby an organic film pattern 101 is formed (FIG. 4C). As etchant, a mixed solution of 1, 3, 5 triisopropylbenzene and aromatic system hydrocarbon is used. Then, using the resist pattern 103 and organic film pattern 101 as a mask, it is dry-etched, thereby unnecessary part of the SiNx film 102 and gate insulating film 107 is removed (FIG. 4D). As etch gas, $O_2/SF_6$ gas is used. Then, using DMSO. amine-system stripper, the resist pattern is removed (FIG. 4E). Finally, re-baking it at 270° C. for 60 min., benzocyclobutene polymer is completely hardened.

The characteristic of this embodiment is that the dry-etching of base is conducted using the organic film pattern obtained by wet-etching as a mask. In this process, the base SiNx film is patterned, and simultaneously benzocyclobutene polymer, which remains after wet-etching, can be also removed. Namely, the two processes, which can be conducted separately in the conventional method, can be done with one process, therefore the productivity can be enhanced. Also, the transmissivity of 3 μm thick benzocyclobutene polymer film is 95% at a wavelength longer than 400 nm, and its heat-resisting temperature is higher than 300° C. Thus, the interlayer insulating film formed has a high transmissivity and high thermal resistance.

The second preferred embodiment of the invention will be explained below. In this embodiment, polysilazane compound is used as a material for interlayer insulating film. The process of making thereof will be detailed in FIGS. 5A to 5E.

In this embodiment, though, like the first embodiment, polysilazane compound may be applied on SiNx film 102 by spin coating, only polysilazane compound can be used as interlayer insulating film (FIG. 5A), without using SiNx film 102. This is because the interface characteristic between polysilazane compound and a-Si layer is good, and because part of polysilazane compound is denatured into silicon dioxide film or silicon nitride film and made to be dense by baking the polysilazane compound, thereby obtaining a good water resistance and pollution resistance. The processes following below are similar to those in the first embodiment, wherein the pre-bake temperature is 160° C. and buffered hydrofluoric acid solution is used as wet etchant. Also, re-baking is conducted at 270° C. for 60 min.

The characteristic of this embodiment is that SiNx film usually used as a base becomes unnecessary by using polysilazane compound. Namely, the process can be further simplified, therefore the productivity can be enhanced. Also, the transmissivity of 3 μm thick polysilazane compound film is 95% at a wavelength longer than 400 nm, and its heat-resisting temperature is higher than 300° C. Thus, the interlayer insulating film formed has a high transmissivity and high thermal resistance.

The third preferred embodiment of the invention will be explained below. In this embodiment, the polymer of Cardo-type represented by structural formula 1 and a compound with epoxy group represented by structural formula 2 is used as a material for interlayer insulating film. The process of making thereof will be detailed in FIGS. 6A to 6E.

Polymer described above is applied on SiNx film 102, which is formed like the conventional method, by spin coating, pre-baked at 150° C. (FIG. 6A). Due to this pre-baking, the etching rate of polymer is varied, and it becomes insoluble to a resist solvent described later, and becomes soluble to a resist developer described later. Then, by applying naphthoquinonediazo-novolac system positive type resist using propyleneglycolmonoethyletheracetate solvent, and then conducting the baking, exposure and development, resist pattern 103 is formed as well as wet-etching the organic film 100 (FIG. 6B). As resist developer, about 0.1 to 1 mol % tetramethylammoniumhydroxide (TMAH) solution is used. Then, using the resist pattern 103 and organic film pattern 101 as a mask, it is dry-etched, thereby unnecessary part of the SiNx film 102 and gate insulating film 107 is removed (FIG. 6C). As etch gas, $O_2/SF_6$ gas is used. Then, using butyllactate, the resist pattern 103 is removed (FIG. 6D). Finally, re-baking it at 250° C. for 30 min., the polymer is completely hardened.

The characteristic of this embodiment is that the wet-etching of organic film is conducted simultaneously with the development of resist. Namely, the number of processes can be further reduced, therefore the productivity can be enhanced. Also, the transmissivity of 3 μm thick polymer film of Cardo-type represented by structural formula 1 and a compound with epoxy group represented by structural formula 2 is 95% at a wavelength longer than 400 nm, and its heat-resisting temperature is higher than 260° C. Thus, the interlayer insulating film formed has a high transmissivity and high thermal resistance.

The fourth preferred embodiment of the invention will be explained below. In this embodiment, the non-photosensitive acrylic resin of methacrylic acid and glygil methacrylate (JSS series, made by JSR) is used as a material for interlayer insulating film. The process of making thereof will be detailed in FIGS. 7A to 7F.

Acrylic resin described above is applied on SiNx film 102, which is formed like the conventional method, by spin coating, pre-baked at 90° C. (FIG. 7A). Due to this pre-baking, the etching rate of acrylic resin is varied, and it becomes insoluble to a resist solvent described later, and becomes soluble to a resist developer described later. Then, by applying naphthoquinonediazo-novolac system positive type resist (JCX-1000, made by JSR) using a mixed solvent of 2-heptanone and ethyl-3-ethoxypropionate, and then conducting the baking, exposure and development, resist pattern 103 is formed as well as wet-etching the organic film 100 (FIG. 7B). As resist developer, about 0.1 to 1 mol % tetramethylammoniumhydroxide (TMAH) solution is used. Then, like the third embodiment, the base may be immediately dry-etched and the resist pattern 103 may be removed. In this case, DMSO.amine-system stripper with an adjusted concentration is to be used, so as not to swell or wear out the organic film pattern 101. Also, after forming the resist pattern 103 and organic film pattern 101, the following process may be conducted: Conducting thermal treatment at 130° C. for 5 min, the organic film pattern 101 is insolubilized to TMAH solution by thermal cross-linking reaction (FIG. 7C). Also, radiating UV light onto the entire surface of substrate, the resist pattern 103 is solubilized to alkali (FIG. 7D).

Then, using the resist pattern 103 and organic film pattern 101 as a mask, it is dry-etched, thereby unnecessary part of the SiNx film 102 and gate insulating film 107 is removed (FIG. 7E). As etch gas, $O_2/SF_6$ gas is used. Then, using TMAH solution, the resist pattern 103 is removed (FIG. 7F). Finally, re-baking it at 250° C. for 30 min., acrylic resin is completely hardened.

The characteristic of this embodiment is that there are a variety of methods of removing resist. By using the characteristic of thermosetting resin, it becomes also applicable to the method using TMAH solution, other than the method using the same resist stripper as that in the third embodiment. Namely, by conducting the two-step thermal treatment of: semi-hardening the organic film by thermal cross-linking reaction to insolubilize it to the resist stripper; and completely hardening it by re-baking after the removal of resist, and further conducting the UV radiation to solubilize it to the stripper, TMAH solution that has a better removing ability than butyllactate and brings a better surface state after stripping than DMSO.amine-system stripper can be used as resist stripper.

Also, acrylic resin used herein is different, from that used in the prior art, in that it does not include any photosensitive group. Therefore, the transmissivity of 3 μm thick film thereof is 95% at a wavelength longer than 400 nm, and its heat-resisting temperature is higher than 260° C. Thus, the interlayer insulating film formed has a high transmissivity and high thermal resistance.

Figure 8A:
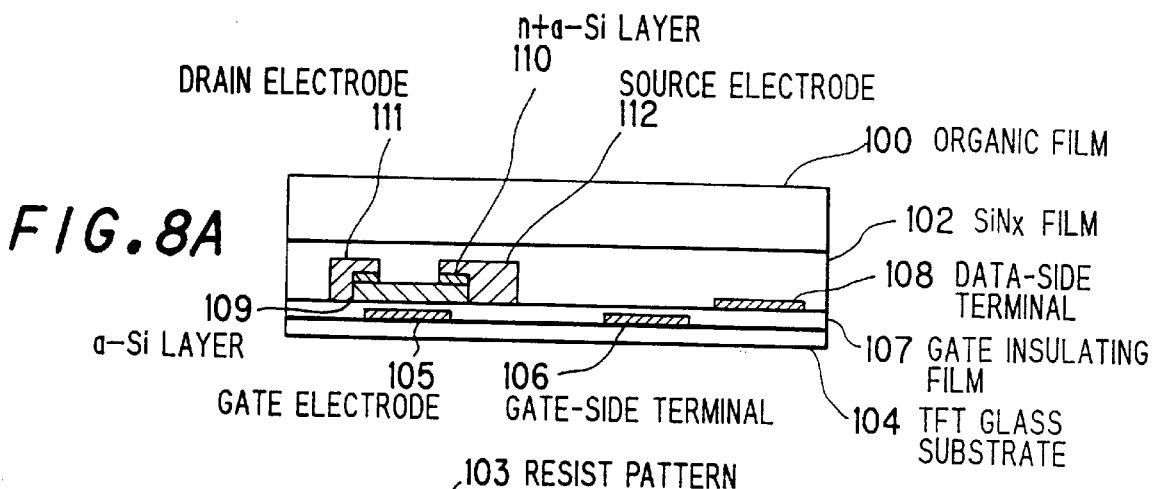
FIGS. 8A to 8E are cross sectional views showing a method of making an active matrix liquid-crystal display device in a fifth preferred embodiment according to the invention.
Figure 8B:
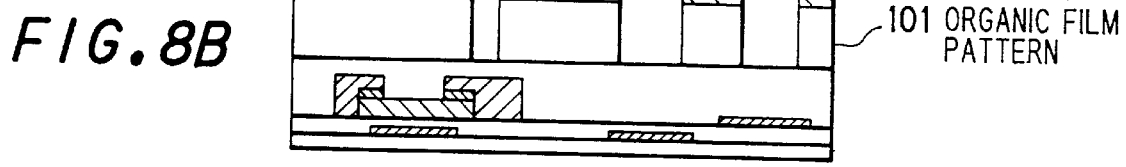
Figure 8C:
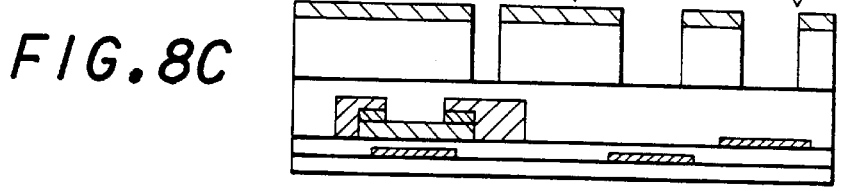
Figure 8D:
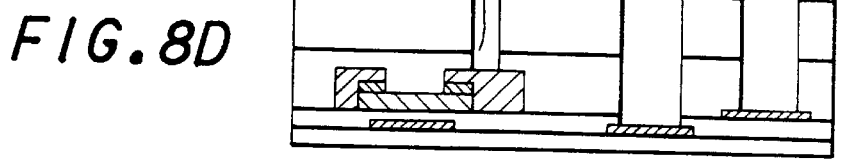
Figure 8E:
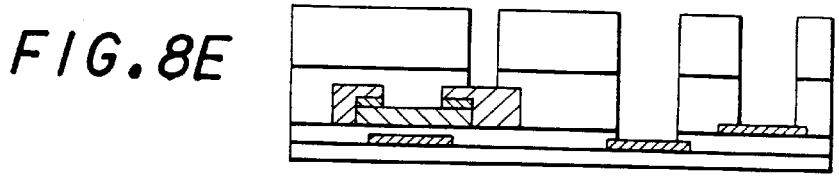

The fifth preferred embodiment of the invention will be explained below. In this embodiment, i-line-sensitive UV-setting Cardo-type polymer is used as a material for interlayer insulating film. The process of making thereof is quite similar to that of the fourth embodiment, the pre-baking is however conducted at 130° C. Also, by using g-line-sensitive positive type resist of naphthoquinonediazo-novolac system using propyleneglycolmonoethyl-etheracetate solvent or methylamine-system solvent, the exposure is conducted at 50 to 100 mJ/cm² by g line. The i-line-sensitive UV-setting Cardo-type polymer does not start optical cross-linking reaction by this exposure. After exposing it and then forming the resist pattern 103 and organic film pattern 101 by development, the base may be immediately dry-etched and then the resist pattern 103 may be removed. In this case, DMSO.amine-system stripper with an adjusted concentration is to be used like the fourth embodiment, so as not to wear out the surface of resin. Also, after forming the resist pattern 103 and organic film pattern 101, the following process may be conducted: Radiating UV light of 500 to 1000 mJ/cm² onto the entire front and back surfaces of substrate, the Cardo-type polymer is semi-hardened by thermal cross-linking reaction, thereby insolubilized to alkali, and simultaneously the resist is solubilized to alkali (FIG. 8C). Also, re-baking it at 250° C. for 30 min., the Cardo-type polymer is completely hardened. Meanwhile, the UV radiation may be conducted before or after dry-etching.

The characteristic of this embodiment is that the property of UV-setting resin is utilized. Namely, the semi-hardening process conducted by thermal cross-linking reaction in the fourth embodiment is herein conducted by optical cross-linking reaction. In this process, the resist can be simultaneously solubilized to TMAH solution, therefore like effect can be obtained with fewer processes. Also, the transmissivity of 3 μm thick Cardo-type polymer film is 92% at a wavelength longer than 400 nm, and its heat-resisting temperature is higher than 250° C. Thus, the interlayer insulating film formed has a high transmissivity and high thermal resistance.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A method for making an active matrix liquid-crystal display device, comprising the steps of:

forming interlayer insulating film, at least part of which composed of organic film, on a TFT (thin-film transistor) substrate with a structure where a pixel electrode and wiring are overlapped;

patterning said organic film; and patterning a base layer using the patterned organic film as a mask.

2. A method for making an active matrix liquid-crystal display device, according to claim 1, wherein said organic film patterning step is conducted by wet etching, and said patterning of said base layer is conducted by dry etching using at least one kind of gas selected from $O_2$, $CF_4$, $CHF_3$ and $SF_6$.

3. A method for making an active matrix liquid-crystal display device, according to claim 2, further comprising the steps of:

forming organic film by applying resin and pre-baking it;

forming a resist pattern by applying resist on the surface of the formed organic film, and by baking, exposing and developing it;

forming a pattern of said organic film by wet-etching said organic film using said resist pattern as a mask;

dry-etching said base layer using said organic film pattern as a mask;

removing said resist; and completely hardening said organic film pattern by re-baking.

4. A method for making an active matrix liquid-crystal display device, according to claim 3, wherein:

said resist is of positive-type resist using naphthoquinonediazo compound as a photosensitive agent, novolac resin as base resin and methylamine-system solvent or propyleneglycolmonoethyletheracetate solvent as a solvent, said developing is conducted using tetramethylammoniumhydroxide (TMAH) solution, and said removing of resist is conducted using a mixed solution of dimethylsulfoxide (DMSO) and monoethanolamine, ethyllactate or butyllactate.

5. A method for making an active matrix liquid-crystal display device, according to claim 4, wherein:

said organic film forming step is conducted by applying benzocyclobutene polymer using propyleneglycolmonoethyletheracetate as a solvent and pre-baking in the temperature range of 130 to 200° C., said organic film pattern forming step is conducted by wet-etching the organic film using a mixed solution of 1, 3, 5 triisopropylbenzene and aromatic system hydrocarbon or a mixed solution of glycolether and synthetic isoparaffin-system hydrocarbon, and said organic film hardening step is conducted by re-baking in the temperature range of 240 to 300° C.

6. A method for making an active matrix liquid-crystal display device, according to claim 4, wherein:

said organic film forming step is conducted by applying polysilazane compound or a polymer of polysilazane compound and acrylic compound and pre-baking in the temperature range of 130 to 200° C., said organic film pattern forming step is conducted by wet-etching the organic film using a buffered hydrofluoric acid solution, and said organic film hardening step is conducted by re-baking in the temperature range of 240 to 300° C.

7. A method for making an active matrix liquid-crystal display device, according to claim 2, wherein:

said organic film pattern forming step is conducted so that the development of resist and the etching of organic film are simultaneously conducted.

8. A method for making an active matrix liquid-crystal display device, according to claim 7, further comprising the steps of:

forming organic film by applying resin and then pre-baking it;

applying resist on the surface of the formed organic film, baking, exposing it;

forming a pattern of said organic film by wet-etching said organic film simultaneously with forming a resist pattern by developing said resist;

dry-etching said base layer using said organic film pattern as a mask;

removing said resist; and completely hardening said organic film pattern by re-baking.

9. A method for making an active matrix liquid-crystal display device, according to claim 8, wherein:

said resist is of positive-type resist using naphthoquinonediazo compound as a photosensitive agent, novolac resin as base resin and methylamine-system solvent, propyleneglycolmonoethyletheracetate solvent, 2-heptanone, ethyl-3-ethoxypropionate, or a mixed solvent of 2-heptanone and ethyl-3-ethoxypropionate as a solvent, said developing of resist and said wet-etching of organic film are conducted using tetramethylammoniumhydroxide (TMAH) solution, and said removing of resist is conducted using a mixed solution of dimethylsulfoxide (DMSO) and monoethanolamine, ethyllactate or butyllactate.

10. A method for making an active matrix liquid-crystal display device, according to claim 9, wherein:

said organic film forming step is conducted by applying a polymer of Cardo-type compound represented by structural formula [1] and a compound with epoxy group represented by structural formula [2] and pre-baking in the temperature range of 110 to 170° C., and said organic film hardening step is conducted by re-baking in the temperature range of 230 to 280° C.

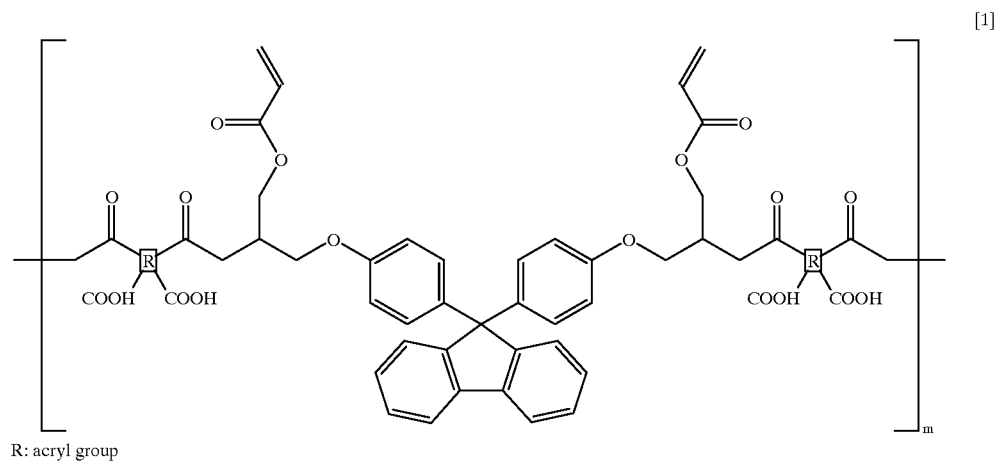

R: acryl group

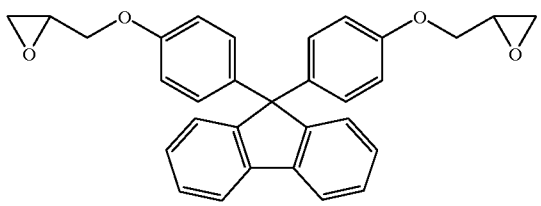

[2]

11. A method for making an active matrix liquid-crystal display device, according to claim 9, wherein:
said organic film forming step is conducted by applying acrylic resin and pre-baking in the temperature range of 80 to 100° C., and
said organic film hardening step is conducted by re-baking in the temperature range of 220 to 260° C.

12. A method for making an active matrix liquid-crystal display device, according to claim 7, further comprising the steps of:
forming organic film by applying thermosetting resin and then pre-baking it;
applying resist on the surface of the formed organic film, baking, exposing it;
forming a pattern of said organic film by wet-etching said organic film simultaneously with forming a resist pattern by developing said resist;
insolubilizing said organic film pattern to a developer by semi-hardening it by thermal cross-linking reaction;
dry-etching said base layer using said organic film pattern as a mask;
solubilizing said resist to the developer by radiating UV light onto at least one of the front and back surfaces of substrate;
removing said resist using said developer; and
completely hardening said organic film pattern by re-baking.

13. A method for making an active matrix liquid-crystal display device, according to claim 12, wherein:
said resist is of positive-type resist using naphthoquinonediazo compound as a photosensitive agent, novolac resin as base resin and methylamine-system solvent, propyleneglycolmonoethyletheracetate solvent, 2-heptanone, ethyl-3-ethoxypropionate, or a mixed solvent of 2-heptanone and ethyl-3-ethoxypropionate as a solvent, and
said developing of resist, said wet-etching of organic film and said removing of resist are conducted using tetramethylammoniumhydroxide (TMAH) solution.

14. A method for making an active matrix liquid-crystal display device, according to claim 9, wherein:
said organic film forming step is conducted by applying acrylic resin and resin including a photopolymerization initiator and pre-baking in the temperature range of 80 to 100° C., and
said organic film hardening step is conducted by re-baking in the temperature range of 220 to 260° C.

15. A method for making an active matrix liquid-crystal display device, according to claim 13, wherein:
said organic film forming step is conducted by applying acrylic resin and resin including a photopolymerization initiator and pre-baking in the temperature range of 80 to 110° C., and
said organic film hardening step is conducted by re-baking in the temperature range of 220 to 260° C.

16. A method for making an active matrix liquid-crystal display device, according to claim 7, further comprising the steps of:
forming organic film by applying UV-setting resin which is sensitive to light of i-line or a shorter wavelength and then pre-baking it;
applying resist on the surface of the formed organic film and baking it;
exposing it with light of g-line;
forming a pattern of said organic film by wet-etching said organic film simultaneously with forming a resist pattern by developing said resist;
radiating UV light onto at least one of the front and back surfaces of substrate, thereby insolubilizing said organic film pattern to a developer by semi-hardening said organic film pattern through cross-linking reaction and solubilizing said resist to the developer;
dry-etching said base layer using said organic film pattern as a mask;
removing said resist using said developer; and
completely hardening said organic film pattern by re-baking.

17. A method for making an active matrix liquid-crystal display device, according to claim 16, wherein:
said resist is of g-line-photosensitive positive-type resist using naphthoquinonediazo compound as a photosensitive agent, novolac resin as base resin and methylamine-system solvent, propyleneglycolmonoethyletheracetate solvent as a solvent and
said developing of resist, said wet-etching of organic film and said removing of resist are conducted using tetramethylammoniumhydroxide (TMAH) solution.

18. A method for making an active matrix liquid-crystal display device, according to claim 9, wherein:
said organic film forming step is conducted by applying a polymer of Cardo-type compound represented by structural formula[1] and a compound with epoxy group represented by structural formula [2], and resin including a photopolymerization initiator, and then pre-baking in the temperature range of 80 to 150° C., and
said organic film hardening step is conducted by re-baking in the temperature range of 230 to 280° C.

19. A method for making an active matrix liquid-crystal display device, according to claim 16, wherein:
said organic film forming step is conducted by applying a polymer of Cardo-type compound represented by structural formula [1] and a compound with epoxy group represented by structural formula [2], and resin including a photopolymerization initiator, and then pre-baking in the temperature range of 80 to 150° C., and
said organic film hardening step is conducted by re-baking in the temperature range of 230 to 280° C.

* * * * *